Aug. 6, 1935.  R. B. FAGEOL ET AL  2,010,629
FRUIT JUICE EXTRACTING PRESS
Filed June 15, 1931  3 Sheets-Sheet 1
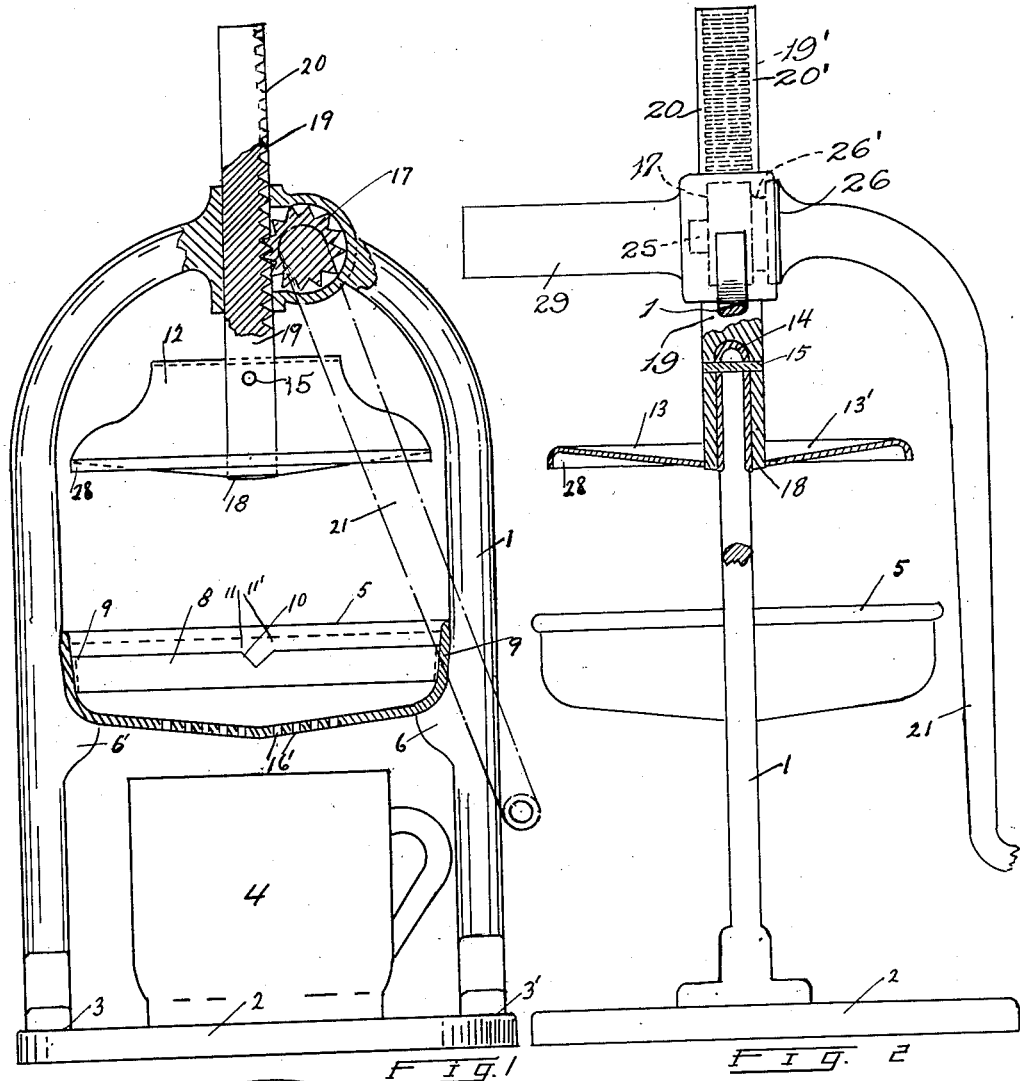
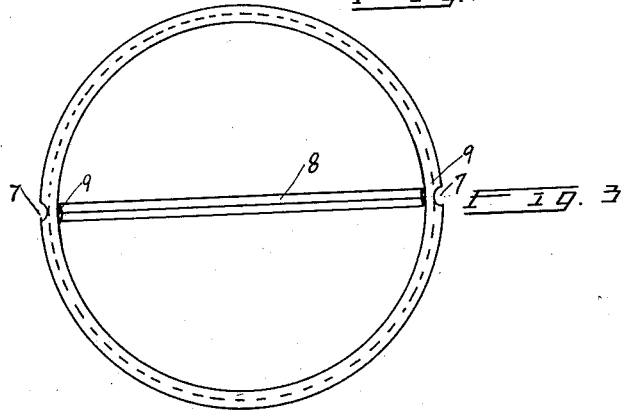
INVENTORS
Rollie B Fageol
Huston Taylor
BY
Strauch & Hoffman
ATTORNEYS.

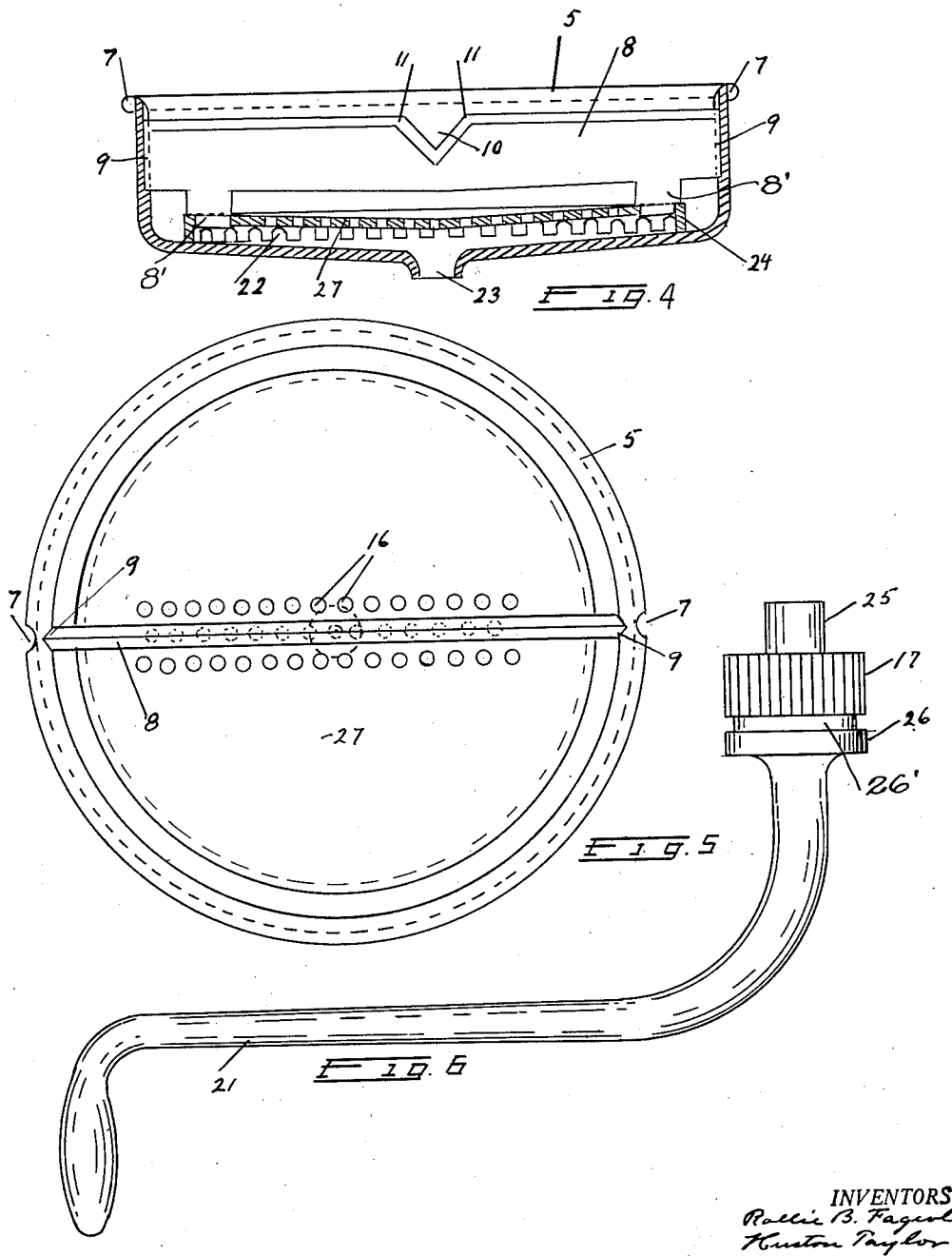

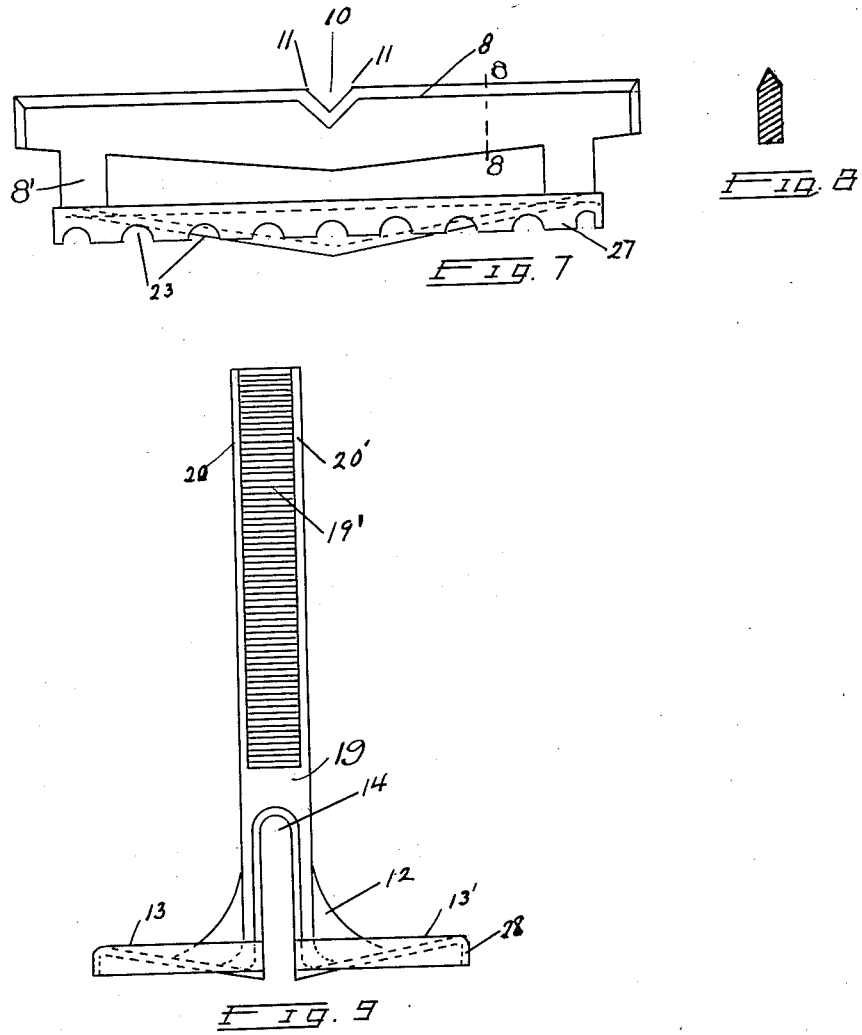

Patented Aug. 6, 1935

2,010,629

UNITED STATES PATENT OFFICE 2,010,629

FRUIT JUICE EXTRACTING PRESS

Rollie B. Fageol, Los Angeles, and Huston Taylor, Pasadena, Calif.

Application June 15, 1931, Serial No. 544,578

4 Claims. (Cl. 100—41)

Our invention and the discoveries in connection therewith relate to a novel and improved method of extracting the juices from fruit, and to the construction of a cutting and pressure apparatus for the carrying out of such and similar methods. It relates to the method of cutting fruit, pressing out the juice thereof, and straining the same in a single operation.

It relates to the construction of a juice extracting fruit press, comprising a frame supporting a pressure bowl having a knife transversely secured therein, in combination with a divided plunger operable toward said knife and bowl.

It relates to the details of a fruit press in which a rack with guarded teeth, and a divided extension at the lower end, is designed to carry two metal plates of spring material, adapted to apply forceful pressure first at the periphery of flattened fruit and to increase the pressure toward a cloven opening across the center of said flattened fruit. It relates to the detail of a removable knife positioned across a compression bowl, having a notch near the center of said knife cutting edge providing two points for centering said fruit and starting the penetration of the rind thereof. It relates to an inverted U shaped frame secured on a base, having means for supporting a compression bowl within said frame sufficiently elevated from said base to provide room for a juice receiving receptacle between said bowl and said supporting base. It relates to the provision of a rack and pinion at or near the top of said frame above said compression bowl and means to manually operate said rack toward and from said compression bowl by means of a hand crank secured to said pinion. It relates to the detail of the sheet metal plunger plates which provides a cover over the cloven section of fruit, and a flange at the outer periphery of a portion of said plunger plates to shield against the scattering of juice, and made conveniently removable for cleaning.

We attain these objects by the methods and mechanism illustrated in the accompanying drawings, in which:—

Fig. 1 is a vertical side elevation of a fruit press in which certain portions are shown in sectional drawings.

Fig. 2 is a vertical front elevation of a fruit press, in which a portion of the handle and frame are fragmentally shown, and plunger sectionally shown.

Fig. 3 is a plan view of a compression bowl of a fruit press showing a cutting blade positioned therein.

Fig. 4 is a sectional elevation of a compression bowl with double bottom.

Fig. 5 is a plan view of compression bowl with double bottom.

Fig. 6 is a plan view of pinion and hand crank assembly.

Fig. 7 is a side elevation of knife and compression plate assembly.

Fig. 8 is a cross-section of knife at 8—8 in Fig. 7.

Fig. 9 is a front elevation of rack and plunger of integral construction.

The commonly used method of extracting the juice of citrus fruit is that of reaming out the juice and pulp together, which not only adulterates the pure juice by mixing the pulp therein but also the extracts from the pulp, which so alters the quality and taste that it is very objectionable to some people. The processes of that method involve the cutting of the fruit by hand, and adapting the various sized fruits to the same size reamer often involving the contact of the hand with the extracting juice, which tends to cleanse the hands in the fruit juice.

The improvement of our method of extracting fruit juices, may be seen in the construction and operation of the apparatus designated in the drawings, in which the similar numerals illustrate similar parts in the several figures.

In Figures 1 and 2, frame 1 is secured to base 2 at 3 and 3'. Elevated sufficiently above base 2 to give space for juice receptacle 4 is the removable compression bowl 5 supported by lugs 6 and 6' on frame 1 and positioned by notches 7 (see Figure 3) in bowl 5 fitting to the shape of frame 1. Across compression bowl 5 is a removable cutting blade 8 positioned at the ends by a groove and bead engagement 9 with said bowl 5, said blade also reinforces the bowl. Said blade has a notch 10 forming points 11 and 11' which are designed to locate a piece of fruit and start the blade in the penetration of the rind. The blade 8 is of wedge shaped construction and is wide at the base to separate the two halves of the fruit, allowing the juice to flow beneath the blade 8 which is elevated from the base of bowl 5. This gives freedom to the juice to flow through apertures 16 at the base of the bowl 5.

Above the pressure bowl is located a plunger 12 formed of sheet metal so that two plates 13 and 13' are provided more or less half round having downward flanges 16 at the periphery edges to shield the juice from scattering in the operation of the press, and a space between said plates to provide clearance for knife 8 when said plunger plates 13 and 13' are brought down toward the bottom of the compression bowl. These two plates may be formed of one piece of sheet metal preferably chromium steel alloy connected by an inverted channel portion 14, or they may be cast integral with rack shaft 19 as in Fig. 9.

The sheet metal stock of plunger 12 has some spring temper so that when it is brought down to the final squeeze, hard pressure is applied to the flattened fruit around its outer edges, then as the pressure is increased the plunger yields slightly upwardly on opposite sides of the channel 14 so as to change the slope of the plates 13 and 13'. This causes almost a complete discharge of the juice toward the cloven or central portion, where it flows through apertures 16 at the bottom of the bowl 5. This method of laterally squeezing both halves of the fruit encloses the pulp and seeds within the rind and discharges only the pure juice.

Operating rack 19 is adapted to engage plunger 12 at its center, here shown in Fig. 2, like a fork straddling the central channel 14 of the plunger plate, with its ends 18 extending through the horizontal plane portion of the plates 13—13' and having pin 15 engaging rack to channel 14 by going through both channel and rack. This pin is removable making it simple to take the plunger plate 12 off for cleansing. The rack is preferably approximately square, having the rack teeth 19' protected at their ends by longitudinal ribs 20 and 20'. These ribs serve three purposes. They protect the hand from the sharp ends of the teeth, they reinforce the strength of the teeth which is needed if made of die casting and they straddle the pinion in the assembly, so that the pinion 17 with handle are held in place and cannot be removed unless the pressure bowl first is removed and the plunger and rack assembly withdrawn from below. Figure 2 shows the lower end of rack 19 forked and engaging plates 13 and 13' at the ends of said forked extension.

The hand crank 21 is provided for the reciprocation of rack 19 and plunger 12 in an operation of the press. Integral with the crank and pinion, and on opposite sides of the latter, are a set of bearing portions 25 and 26 for journaling the crank and pinion device in the upper arch of the framework. There is an annular recess 26', between the pinion and the bearing portion 26, for receiving one of the ribs 20 of the rack 19 and thus permitting the pinion to mesh properly with the rack teeth. One of the features of the invention is the counter clock wise movement of the crank to operate the plunger in a downward direction, and the location of the handle relative to the final squeeze, at which time the handle is toward the operator and between the half way horizontal position and the bottom position of the handle. This is determined by the position of the pinion 17 on rack 19 relative to the position of handle 21, and makes it convenient for the operator to apply a hard downward pressure at an angle and position most convenient.

On the upper part of the frame is provided a handle 29 in Fig. 2 for steadying the press in the operation thereof.

Frame 1 is preferably designed with two vertical sections engaged to a base 2 below and engaged to each other at the top. They are also engaged by the bowl 5 as shown.

A perpendicular reciprocating movement of the plunger 12 relative to the plane of bowl 5 is an important feature of the invention as it steadies the fruit in place better than a rolling or angular movement.

In Figures 4, 5, and 7, we have shown a sectional elevation of compression bowl, differing from 5 in Figures 1 and 3 in that a perforated compression plate 27 is secured to knife 8 and designed to be inserted into bowl 5, which has a single aperture 23 at the bottom through which the juice is gathered to a single center, making it convenient to receive the juice in a glass rather than in a larger receptacle 4 as shown in Fig. 1. The knife is spaced from and permanently united with the plate 27 in any suitable manner, as by a pair of spaced legs 8' integral with the knife and fitted tightly into apertures in the plate. This removable blade and compression plate assembly makes it convenient to dispose of the compressed rind and seeds by manually engaging the knife and lifting the rind with compression plate 27. Said plate 27 being of smaller diameter than the cylindrical portion of the bowl 5, and elevated from the bottom of said bowl 5 by a serrated downward flange 24 on the periphery of plate 27 allows the juice to flow over the edge of plate 27 and to aperture 23 of bowl 5.

This assembly (in Figures 4, 5, and 7) of bowl 5, compression plate 27 and knife 8 is the preferred form in that it allows for the variation of the size and texture of fruit, and prevents the extracted juices from closing the small holes 16 by rind pulp and seeds, as the overflowing juices go over the edge of plate 27 and between serrations 22 of flange 24 to aperture 23.

The plate 27 has a multiplicity of holes 16 located relatively below the knife, through which fruit juice strains when press is operated. The bottom of knife 8 is so elevated above compression plate 27 that the edges of the fruit rind are forced beneath the knife. This prevents the lifting of the fruit rind by suction on the bottom of plunger 12.

It is apparent that this invention facilitates the extraction of juices of fruit and preserves the quality of the juices without mixing it with pulp or the extracts therefrom. It is also a practical manufacturing proposition and fulfils a felt need for more convenient means of extracting juices of citrus or other fruits.

By this method and construction a piece of whole fruit is not only cut in two and the juice pressed out, but rind is pressed between plates 13 and 13' and 27 which are without perforations except near the cloven section of the fruit thereby sealing the rind juices in the outside of rind without allowing them to be extracted and discharged into the fruit juice.

We claim:
1. In a device for extracting the juices from fruits or the like, means comprising a pair of pressure plates, one of which plates is movable toward the other to crush the fruit, a knife fixed on and coextensive with a diameter of one of said plates so that the fruit is separated into two sections when said plates are moved relative to each other, one of said pressure plates having a substantially unyielding central portion substantially coextensive with and adjacent to said knife and a yieldable outer portion, whereby when said plates are moved relative to each other to crush the fruit the final crushing pressure is applied progressively from the outer periphery toward said knife.

2. In the combination as set forth in claim 1 in which the plate to which said knife is fixed is imperforate, except for a series of juice receiving apertures therein arranged in a line parallel to said knife and in close proximity thereto, whereby the juice of said fruit will be conducted away from the cut portion of said fruit and extracts from the rinds will be prevented from entering said receiving apertures.

3. In the combination as set forth in claim 1, one of said plates being fixed and in which said knife is fixed to said fixed plate and is provided with a portion spaced from said plate whereby the cut edges of the fruit rinds will be engaged in the space between said plate and said knife to prevent the rind from being lifted by the suction of the movable plate when the latter is moved away from said fixed plate.

4. In a manually operable press, a framework provided with a guideway, a plunger slidable axially in said guideway, one face of said plunger having a longitudinal rib, and an actuating device comprising an operating handle having a pinion mounted in said framework and engaging the ribbed face of the plunger, said framework being designed to permit said actuating device to be bodily removed simply by pulling on the latter, but said rib normally being disposed in the path of removal, a bowl removably supported in line with the plunger to engage said plunger to limit downward movements thereof and thereby prevent disengagement of said rib from said actuating device, whereby said actuating device cannot be removed without first removing said bowl.

ROLLIE B. FAGEOL.
HUSTON TAYLOR.